United States Patent [19]

Kaye

[11] 4,299,142
[45] Nov. 10, 1981

[54] GRINDING MACHINE WITH REORIENTABLE CHAIN HOLDING CLAMP

[75] Inventor: Peter D. Kaye, Monroe, Oreg.

[73] Assignee: Bell Industries, Inc., Los Angeles, Calif.

[21] Appl. No.: 113,373

[22] Filed: Jan. 18, 1980

[51] Int. Cl.³ ............................................. B23D 63/16
[52] U.S. Cl. .................................... 76/25 A; 76/40; 76/42; 51/98.5
[58] Field of Search ................... 76/37, 25 A, 40, 42, 76/74, 78; 51/98 R, 98.5, 99

[56] References Cited

U.S. PATENT DOCUMENTS

| | | | |
|---|---|---|---|
| 3,013,448 | 12/1961 | Deck | 76/40 |
| 3,349,645 | 10/1967 | Silvey | 76/40 |
| 3,779,103 | 12/1973 | Silvey | 76/40 |
| 4,044,635 | 8/1977 | Simington | 76/42 |

Primary Examiner—Roscoe V. Parker
Attorney, Agent, or Firm—Kolisch, Hartwell & Dickinson

[57] ABSTRACT

Grinding apparatus which includes a clamp for holding an article to be ground. The clamp is swung, in orbital fashion, to move the clamp from a position located under a lower edge portion of a grinding wheel located on one side of the wheel's rotation axis, to a position located under a lower edge portion of the grinding wheel located on the opposite side of the wheel's rotation axis. In the sharpening of saw chain, the clamp is used in holding chain during the sharpening of cutter links of one hand when occupying one position, and is used in holding chain during the sharpening of cutter links of opposite hand when occupying its outer position.

9 Claims, 5 Drawing Figures

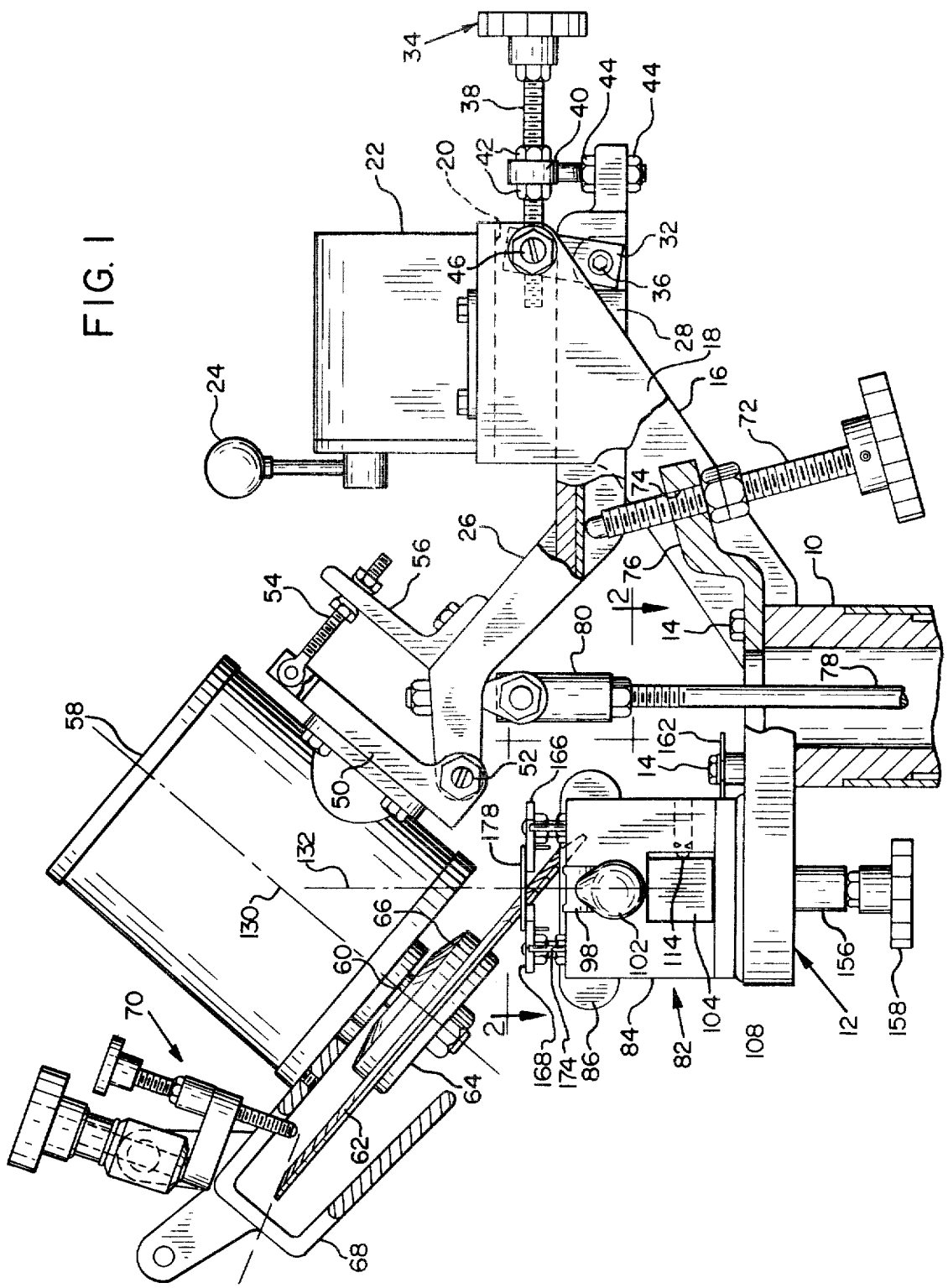

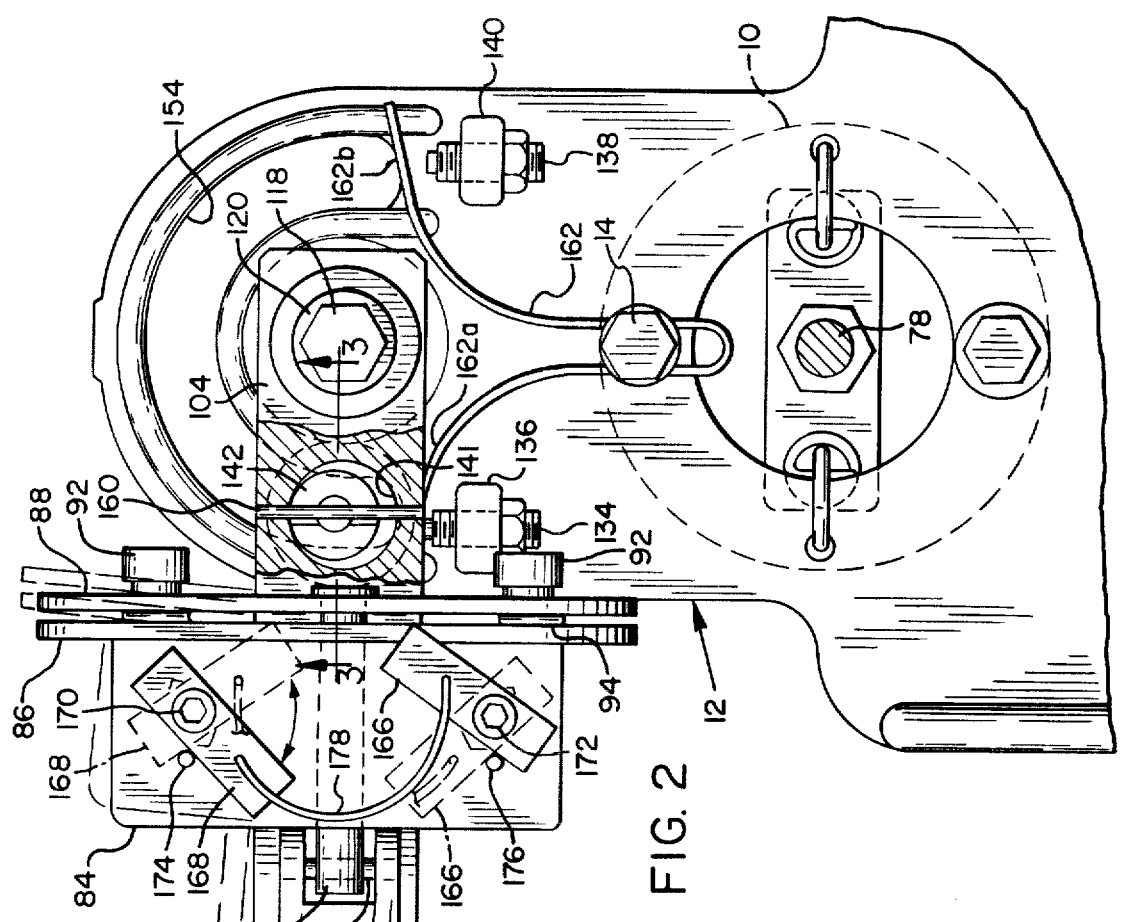

GRINDING MACHINE WITH REORIENTABLE CHAIN HOLDING CLAMP

BACKGROUND AND SUMMARY OF THE INVENTION

This invention relates to grinding apparatus, and more particularly to grinding apparatus wherein an edge of a grinding wheel in the apparatus is used to produce two different types of grinds in an article.

Exemplary of the above is a grinding machine constructed to permit the grinding of left and right hand cutter links in a saw chain. Describing a typical saw chain, a so-called chisel saw chain includes cutter links with links of one hand distributed along the length of the chain and interspersed with links of the opposite hand. The side and top plate portions of, for example, a left hand cutter link, may be accurately sharpened with a "bevel file" by advancing a properly dressed grinding wheel into the gullet of the link and against the side and top plate portions in the link. Any setting of the means which mounts the saw chain cutter link, while proper for cutter links of one hand, is improper for the sharpening of links of the opposite hand.

This invention contemplates a grinding machine for the grinding of articles such as the saw chain described, which features a releasable clamp for holding the saw chain, and a mounting for the clamp which enables it to be swung in orbitable fashion about what is referred to herein as a clamp orientation axis, between a pair of substantially oppositely disposed positions. In one position the clamp is properly positioned for holding saw chain while cutters of one hand are being sharpened, and in the other position the clamp is properly positioned for holding saw chain while cutters of the opposite hand are being sharpened.

A further feature of the grinding machine of the invention is the provision of a novel construction whereby, with the clamp in either of its two adjusted positions, a limited amount of play is afforded the clamp, facilitating movement of a cutter link clamped by the clamp against the grinding wheel to produce the desired sharpening.

Another feature of the grinding machine contemplated is a novel indexing means associated with the clamp described, used to index or position successive cutter links to prepare the link for the grinding operation. The indexing means has one adjusted position used when sharpening right hand cutter links, and another adjusted position used when sharpening left hand cutter links.

A general object of the invention therefore, is to provide a novel grinding machine which includes a clamp for holding the article to be ground which has one orientation when holding an article during the performance of one type of grind, and which is reorientable to assume another orientation when holding the article during the performance of a different type of grind.

More specifically, an object of the invention is to provide such a grinding machine where the clamp is swung in orbitable fashion about a clamp orientation axis, to place it in different positions for the holding of an article subjected to grinding.

Yet a further object is to provide, in such a grinding machine, novel means for defining different adjusted positions for the clamp.

Another object is to provide novel indexing means for positioning an article in the clamp prior to its being ground, usable with the clamp occupying either of two orientation it has with respect to a grinding wheel.

These and other objects and advantages are attained by the invention, which is described hereinbelow in conjunction with the accompanying drawings, wherein:

BRIEF DESCRIPTION OF THE DRAWINGS

FIG. 1 is a side elevation, with portions broken away, of a grinding machine constructed in accordance with the invention;

FIG. 2 is a plan view of the machine, taken generally along the line 2—2 in FIG. 1, and drawn on a slightly larger scale;

FIG. 3 is an enlarged, cross-sectional view, taken generally along the line 3—3 in FIG. 2;

DETAILED DESCRIPTION OF THE INVENTION

Figure 4:
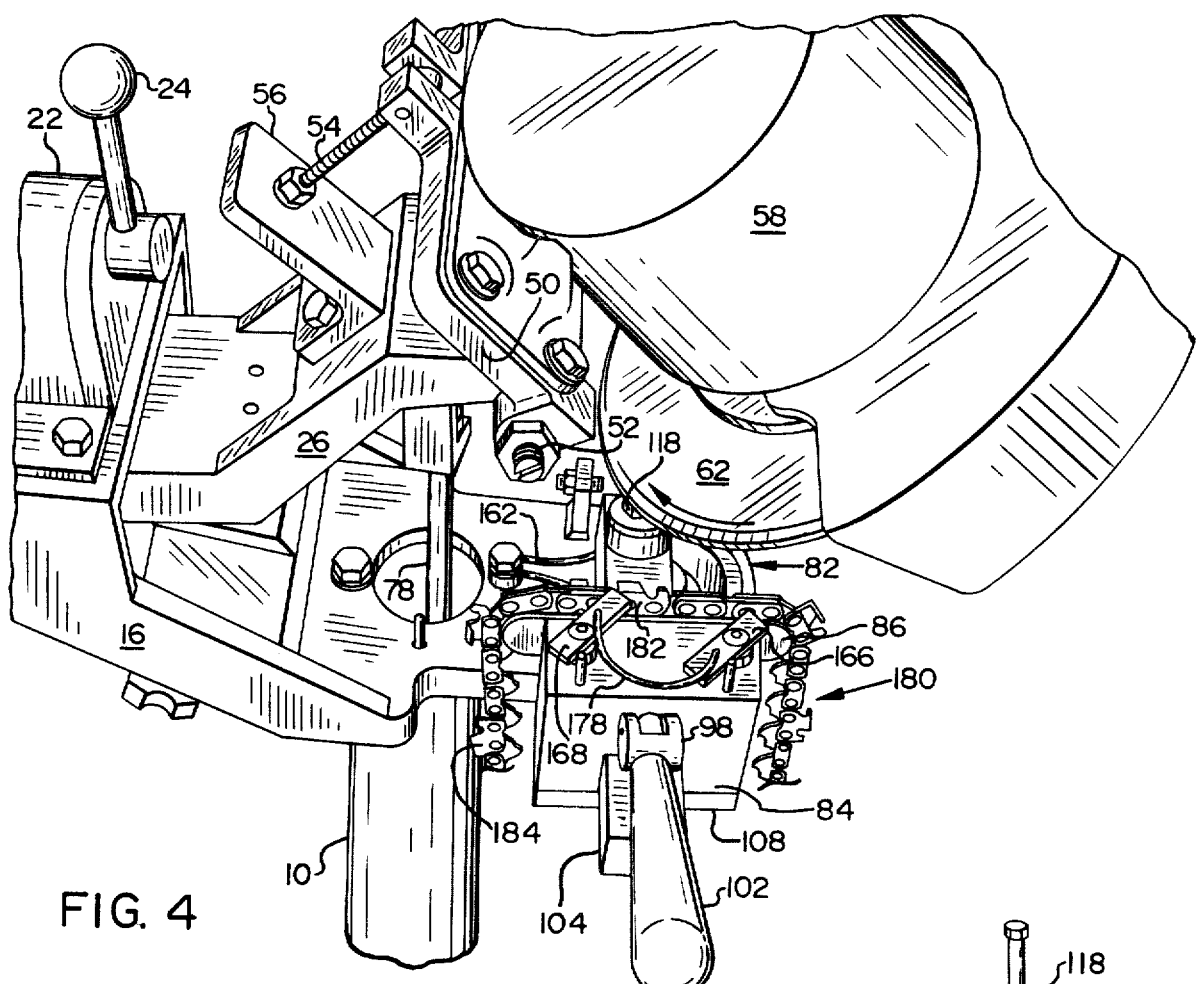
FIG. 4 is a prespective view of the portions of the machine illustrated in FIG. 1; and, FIG. 5 is an exploded view, illustrating details of how a clamp in the device is mounted.

Referring now to the drawings, the grinding machine shown comprises a pedestal or base 10. Not shown, because lower portions of the pedestal have been broken away, is suitable means supporting the pedestal in a vertical position on the ground. Secured to the top of the pedestal, and providing a mounting for principal operating parts of the grinder is a frame 12. The frame is attached to the standard by fasteners 14.

The rear of frame 12 includes a pair of upwardly inclined, laterally spaced arms 16, 18, joined at their upper extremeties by a platform portion 20. This platform portion provides a mounting for a reversing switch 22 controlled by handle 24.

Illustrated at 26 is a motor arm which provides support for the grinding wheel motor in the grinding machine. The motor arm has a rear platform section 28 disposed under platform portion 20 of frame 12. Opposite ends of a motor arm pivot shaft (not shown) are fixedly secured by fasteners, such as fasteners 36, to upstanding motor arm links, one being provided on either side of the rear platform section, and illustrated in FIG. 1 at 32. The motor arm shaft pivotally supports motor arm 26 for relative pivotal movement about the axis of the shaft which corresponds to the axes of fasteners 36.

Upper extremeties of the motor arm links are pivotally supported, as by pivot screws 46, on arms 16, 18 of frame 12.

Not shown, but extending between pivot screws 46 is a pivot shaft having an internally threaded bore extending transversely therethrough located midway between its ends. This bore receives the threaded stem 38 of a feed screw 34. The stem also loosely passes through the non-threaded interior of the loop in an eye bolt member 40, which is positioned on the stem by nuts 42. The lower end of the eye bolt member is secured to platform section 28 by nuts 44.

The structure described permits adjustments in the position of the motor arm, with counterclockwise rotation of the feed screw in FIG. 1 serving to retract the motor arm, or to move the motor arm to the right in FIG. 1. Clockwise rotation of the feed screw produces the opposite result. Pivot screws 46 and the pivot shaft interposed between these pivot screws enable motor arm 26 to pivot in FIG. 1 about a horizontal pivot axis coinciding with the axes of screws 46.

A motor base 50 is pivotally secured as by pivot screws 52 to the forward extremity of the motor arm. Also mounting the motor base is an eye bolt 54, and an angle 56 secured to the motor arm. The motor base mounts electric motor 58 having a power driven arbor 60 upon which is mounted grinding wheel 62 through inside and outside wheel flanges 64, 66. A wheel guard for the grinding wheel mounted on the motor casing is shown at 68. Dressing mechanism for the grinding wheel is indicated at 70. Electrical connections connecting reversing switch 22 and motor 58, whereby the reversing switch controls the motor, are not shown.

Defining a lowered position for the motor arm and the grinding wheel which is mounted thereon, is depth adjustment screw 72 threadably received in bore 74 formed in ledge 76 of frame 12.

The grinding wheel is raised from the lowered position shown in FIG. 1 through actuation of lift rod 78 connected to the motor arm through linkage 80. A foot operated pedal and spring biasing mechanism is provided for raising and lowering the motor arm through raising and lowering of the lift rod, this structure being eliminated from the drawings as being conventional and forming no part of the invention.

Figure 5:
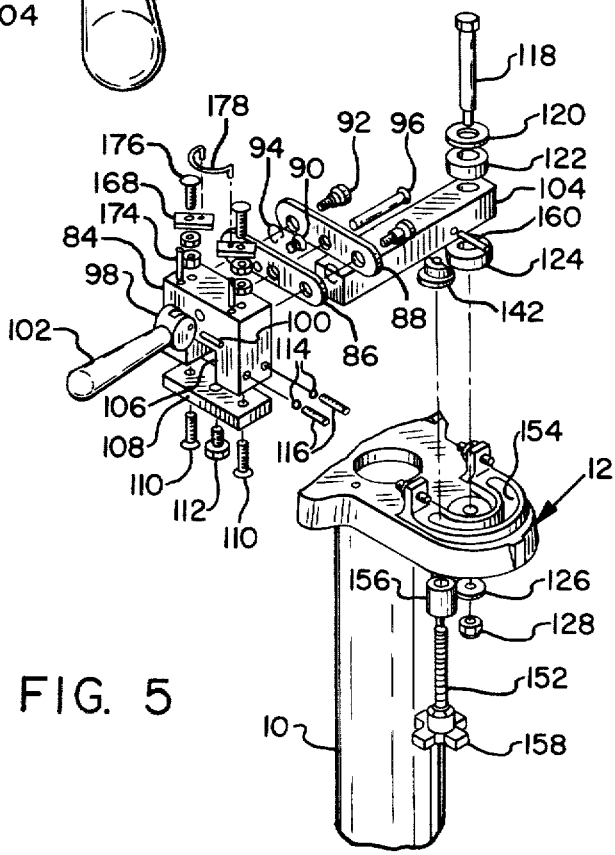

Saw chain during sharpening is held in the grinding machine by a clamp shown generally at 82. More specifically, and referring in particular to FIG. 2, the clamp includes a block or clamp bar holder 84 of substantially rectangular configuration. Assembled at the front face of the clamp bar holder are a pair of clamp bars 86, 88. Referring in particular to FIG. 5, the clamp bar closest to the holder 84 is fixed to the holder by a screw 90. The other clamp bar is supported on the holder by shoulder screws 92, the threaded extremeties of these screws being screwed into the holder 84 and the clamp bar being slidably supported on the shoulders of the screws. Interposed between the two clamp bars are "C" springs 94 mounted on the shoulders of screws 92.

A headed pin 96 extends through the two clamp bars, and a bore in the bar holder, to an end which protrudes out from the opposite side of the bar holder, as best seen in FIG. 2. A cam 98 connected to this protruding end by pin 100 is rotated through actuation of handle 102, to draw pin 96 through the clamp bar holder against the biasing action of the "C" springs.

The two clamp bars and associated structure constitute releasable means for holding saw chain. The chain is mounted in place by placing lower extremities of its drive links between the clamp bars, and by resting the bottoms of the tie straps and cutters and other links in the chain on the top edges of the clamp bars.

The clamp bar holder is mounted on a clamp pivot bar 104. More specifically, and referring to FIG. 5, channel passage 106 fits over the top of the pivot bar, and the bottom of the passage is closed off by a plate 108 fastened to the base of the bar holder by screws 110. An adjustment screw 112 is loosened to permit movement of the holder 84 along the length of the pivot bar, and tightened to secure the holder in a given adjusted position.

Screws 116 and balls 114 assure a precision fit of the pivot bar within passage 106.

The pivot bar is rotatably mounted for swinging movement about a vertical axis on frame 12 by shoulder screw 118, washer 120, thrust bearings 122, 124, washer 126 and nut 128. The axis about which the bar moves is indicated at 132 in FIG. 1, and is referred to herein as a clamp orientation axis.

The axis of arbor 60 is the rotation axis of grinding wheel 62, this axis being shown at 130 in FIG. 1. This axis forms an obtuse angle with axis 132 about which the clamp is movable, and intersects axis 132 thus to define a plane. The plane is vertical and substantially bisects frame 12 as such is pictured in FIG. 2. The clamp may be swiveled in an orbital path from the position shown in FIG. 2 to the opposite side of this plane and frame 12. Defining a limit position for the clamp on the left side of this plane, and as the clamp is pictured in FIG. 2, is a screw 134 mounted in post 136. On the opposite side of this plane, this limit position is defined by screw 138 mounted in post 140.

Referring now to FIGS. 2 and 3, mounted within a cylindrical wall 141 extending upwardly from the bottom side of the clamp pivot bar is a limited play element or member 142 having a cylindrical shank portion 144 of smaller diameter than well 141, a flange portion 146 at its bottom end, and formed at its top end with a shelf 148. A threaded bore 150 extends axially along the member.

As assembled, the bottom end of member 142 rests on the face of frame 12. The threaded end of an anchoring screw 152 extends upwardly through an arcuate slot 154 provided in frame 12, and has an upper extremity screwed into a bore 150. A spacer 156 is interposed between the bottom of frame 12 and handle 158 of the anchoring screw. A roll pin 160 mounted in the clamp pivot bar extends across the upper part of the limited play member in the region of shelf 148, the roll pin preventing the play member from rotating.

As seen in FIG. 2, fastened to frame 12 through fastener 14 is a spring 162 having opposite ends extending across slot 154 adjacent opposite extremities of the slot. With the clamp positioned as in FIG. 2, so that the lower side of the clamp pivot bar is against screw 134, end 162a of the spring engages flange 146 of the limited play member to urge such to the eccentric position shown for the member in FIG. 2 within well 141. With the clamp swung to the opposite side of frame 12, and against limit screw 138, end 162b of the spring urges the limited play member to the opposite side of the well.

By reason of the structure described, when the clamp is placed as shown in FIG. 2 with a side of the pivot bar against stop screw 134, should the operator then tighten play member anchoring screw 152, with this adjustment made a pair of limit positions are defined for the clamp. One limit position is with the side of the pivot bar agains the stop screw, and the other limit position is with the lower side of member 142 against the lower surface of well 141 as such pictured in FIG. 2. Thus, the clamp is afforded limited defined play, which the operator can use in bringing the cutter of a cutter link into engagement with the grinding wheel.

Indexing means is provided for properly positioning the cutter link of a saw chain preparatory to grinding the link. More specifically, and referring to FIG. 2, rotatably mounted on the top of clamp bar holder 84 are a pair of pawls 166, 168. Screw 170 fastened to holder 84 rotatably mounts pawl 168, and screw 172 performs the same function for pawl 166. Pins 174, 176 mounted in bar holder 84 and projecting up from the top thereof, define limit positions for these pawls. A pawl spring 178 has ends anchored in the pawls.

With the pawls positioned as shown in FIG. 2, the longer end of pawl 168 is against pin 174, and the shorter end of pawl 166 is against pin 176. This positions pawl 166 with its longer end extending over clamp bar 86, whereas the other pawl is positioned entirely over the clamp bar holder. A chain mounted between the clamp bars is properly positioned when the back of the link to be ground is in engagement with the longer end of pawl 166. After grinding of the link and release of the clamp, by sliding the chain in an upward direction as the mechanism is illustrated in FIG. 2, a new link of the same hand may be moved beyond the pawl and then backed up into the protruding end of the pawl to position the new link. With positioning of the clamp on the opposite of the frame 12 in FIG. 2, i.e., with the opposite side of pivot bar 104 against stop screw 138, pawl 166 may be swung to place its longer end against pin 176, and pawl 168 positioned to have its shorter end against pin 174 so that its longer end protrudes over the clamp bars. With this position of adjustment, the indexing means may be used in the indexing of cutter links of opposite hand.

Very briefly describing the operation of the grinding machine, and referring to FIG. 4, a reach of saw chain, such as the chain shown at 180, is mounted with lower portions of the chain between the clamp bars and with the rear part of a cutter link against the appropriate pawl. The chain is then clamped by pushing down on handle 102 to rotate cam 98. This is done with the grinding wheel in a raised position. As shown in FIG. 4, a lower edge of the grinding wheel which is toward the viewer in FIG. 4 from the plane defined by the axis of the grinding wheel and orientation axis 132 is located directly above the cutter.

After positioning of the chain, the grinding wheel is lowered through actuation of rod 78. This brings the lower edge of the grinding wheel into the gullet of the cutter link. Using handle 102, and relying upon the limited play provided the clamp as earlier described, the clamp is moved to bring the cutting edge of the cutter into engagement with the edge of the grinding wheel.

After sharpening of a cutter link, the clamp is released. The chain is advanced, by moving it to the right in FIG. 4, to bring the next cutter link of the same hand, i.e., cutter link 184, past pawl 168. The chain is then moved back, until its rear end engages pawl 168. The link then may be sharpened using the procedure just described. In this manner, all cutter links of the same hand are sharpened on the chain.

To sharpen cutter links of the opposite hand, the clamp is freed by loosening anchoring screw 152. This permits the clamp to be swung in orbital fashion about axis 132, to place it on the opposite side of frame 12. The clamp becomes reoriented, to have a position opposing the position it formally had. Upon being repositioned, the anchoring screw is tightened. The pawls are repositioned as earlier described. The lower edge of the grinding wheel on the opposite side of the plane defined by the grinding rotation axis and the orientation axis is then utilized to grind cutter links of opposite hand.

It is claimed and desired to secure by Letters Patent:

1. A saw chain grinding machine comprising,
    a clamp, and means mounting the clamp for swinging movement about an upright axis,
    said clamp having releasable means for holding the base of a reach of saw chain with upper extremeties of said chain facing upwardly,
    a grinding wheel disposed above said clamp having a grinding wheel rotation axis disposed laterally of the chain held by said releasable means, said grinding wheel having a lower side edge located to one side of said grinding wheel rotation axis disposed above said releasable means of said clamp,
    first and second stop means operable to limit swinging movement of the clamp about said upright axis, said releasable means throughout said limited swinging movement being maintained below said lower side edge of the grinding wheel, and
    a mounting for said grinding wheel including means for lowering the grinding wheel to move its said side edge toward the clamp and into the chain held by said releasable means.

2. A saw chain grinding machine comprising,
    a pedestal,
    a clamp,
    mounting means for said clamp including pivot means spaced laterally from the clamp pivotally mounting the clamp on said pedestal for orbital movement of the clamp in a substantially 180° arc about an upright axis,
    stop means defining one position for the clamp at one end of said arc, and another position for the clamp at the opposite end of said arc,
    said clamp having releasable means for holding the base of a reach of saw chain with such chain facing upwardly on the clamp,
    said clamp in either of its said positions having an inner side facing said axis and an outer side facing away from said axis, means disposed outwardly on the clamp from said releasable means for actuating said releasable means,
    a power-driven grinding wheel disposed over said clamp in a position where a lower side edge of the wheel on one side of the wheel's rotation axis overlies said chain saw with the clamp in its one position and a lower side edge of the wheel on the opposite of the wheel's rotation axis overlies said chain saw with the clamp in its other position, and
    a mounting for the grinding wheel on said pedestal including means for lowering of the grinding wheel to place its edge in contact with saw chain held by said releasable means with the clamp in either of its two position.

3. The grinding machine of claim 2, wherein the mounting means for said clamp further includes a bar extending from the clamp to said pivot means, and which further comprises a securing element, a mounting for said limited play element on said bar, said mounting for the limited play element affording a limited amount of play of said bar, and means for anchoring the limited play element to said pedestal with the clamp in either of its two said positions.

4. The grinding machine of claim 2, which further includes indexing means for said clamp for the positioning of the saw chain on said clamp, said indexing means having one position of adjustment with said clamp in its one position and another position of adjustment with the clamp in its said other position.

5. In a grinding machine,
    a releasable clamp for holding an article to be ground,
    means mounting said clamp for orbitable movement about a clamp orientation axis,
    a power-driven grinding wheel rotatable about a grinding wheel rotation axis, said grinding wheel rotation axis intersecting said orientation axis and with said orientation axis defining a plane,
    said clamp being movable about said orientation axis between one position located on one side of said plane and another position located on the opposite side of said plane, the edge of the grinding wheel extending to opposite sides of said plane and being adjacent said clamp with such positioned in either of said positions, and means for producing relative movement of the grinding wheel and clamp to move the edge of the grinding wheel more closely adjacent said clamp and against an article held by the clamp with the clamp in either of its said positions.

6. The grinding machine of claim 5, which further includes indexing means for said clamp having one adjusted position for positioning an article to be ground with the clamp in its said one position, and another adjusted position for indexing an article to be ground with the clamp in its said other position.

7. The grinding machine of claim 5, wherein said clamp includes releasable means for holding the base of a reach of saw chain, with said reach substantially paralleling said plane with said clamp in either of its said positions, said clamp in either of its said positions having an inner side facing said orientation axis and an outer side facing away from said axis, and hand-operated means for actuating said releasable means disposed outwardly on the clamp from said releasable means with the clamp in either of its said positions.

8. The grinding machine of claim 5, wherein the means for producing relative movement of the grinding wheel and clamp comprises a pivot mounting for the grinding wheel whereby it may be swung in an arc toward the clamp about an axis which is perpendicular to said plane.

9. The grinding machine of claim 5, wherein said means mounting said clamp comprises a clamp pivot bar pivotally mounted for pivotal movement about said orientation axis, and which further includes first and second stop means affording limited defined play for said bar with said clamp in either of its positions.

* * * * *